United States Patent [19]

Leubecker

[11] Patent Number: 5,649,584
[45] Date of Patent: Jul. 22, 1997

[54] EXTENDIBLE VEHICLE WINDSHIELD SUNSHADE

[76] Inventor: Vernon J. Leubecker, 10 E. Lee St. #2407, Baltimore, Md. 21202-6009

[21] Appl. No.: 690,585

[22] Filed: Jul. 31, 1996

[51] Int. Cl.⁶ ........................................................ B60J 3/02
[52] U.S. Cl. ................................. 160/370.23; 160/DIG. 3
[58] Field of Search ...................... 160/370.23, 370.22, 160/370.21, 84.01, 84.04, 84.03, 167 R, 167 V, DIG. 2, DIG. 3, 113, 115; 296/97.7, 97.8, 97.11

[56] References Cited

U.S. PATENT DOCUMENTS

| D. 309,885 | 8/1990 | Gurruchaga . |
| D. 367,029 | 2/1996 | Spaulding . |
| 3,110,246 | 11/1963 | McConeghy, Jr. et al. . |
| 4,202,396 | 5/1980 | Levy . |
| 4,248,474 | 2/1981 | Mandrick . |
| 4,652,039 | 3/1987 | Richards . |
| 4,727,920 | 3/1988 | Siegler . |
| 4,776,628 | 10/1988 | Polito . |
| 4,824,161 | 4/1989 | Lee . |
| 4,838,335 | 6/1989 | Eskandry et al. . |
| 4,878,708 | 11/1989 | Champane . |
| 4,883,304 | 11/1989 | Elliott . |
| 4,886,104 | 12/1989 | Eldridge, Jr. . |
| 4,929,014 | 5/1990 | Clark et al. . |
| 4,947,920 | 8/1990 | Moll . |
| 5,044,686 | 9/1991 | Acenbrack . |
| 5,165,748 | 11/1992 | O'Connor . |
| 5,267,599 | 12/1993 | Kim . |
| 5,273,097 | 12/1993 | Siegler . |
| 5,314,226 | 5/1994 | Tovar . |
| 5,511,602 | 4/1996 | Choi et al. . |

FOREIGN PATENT DOCUMENTS

| 2159200 | 11/1985 | United Kingdom . |
| 2242176 | 9/1991 | United Kingdom . |

*Primary Examiner*—David M. Purol
*Attorney, Agent, or Firm*—Dowell & Dowell

[57] ABSTRACT

A sunshade for vehicle windshields which includes a plurality of hinge sections which are foldable relative to one another to form a compact unit for storage and which are horizontally extendible when deployed across a substantial width of the vehicle windshield. Each section includes a fixed base panel member and a vertical sliding member which is extendible outwardly relative to the fixed member so that the sunshade is effectively adjustable for the height of a particular vehicle windshield.

11 Claims, 3 Drawing Sheets

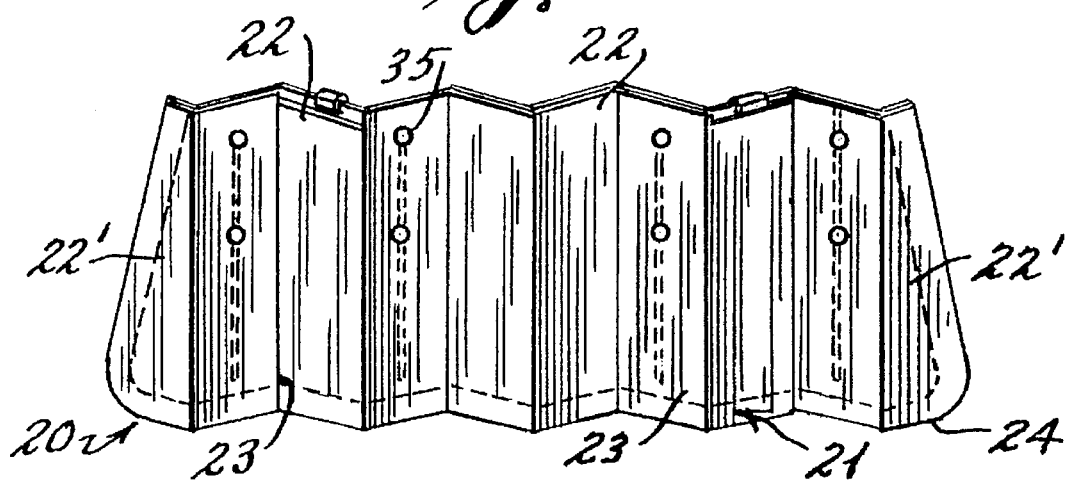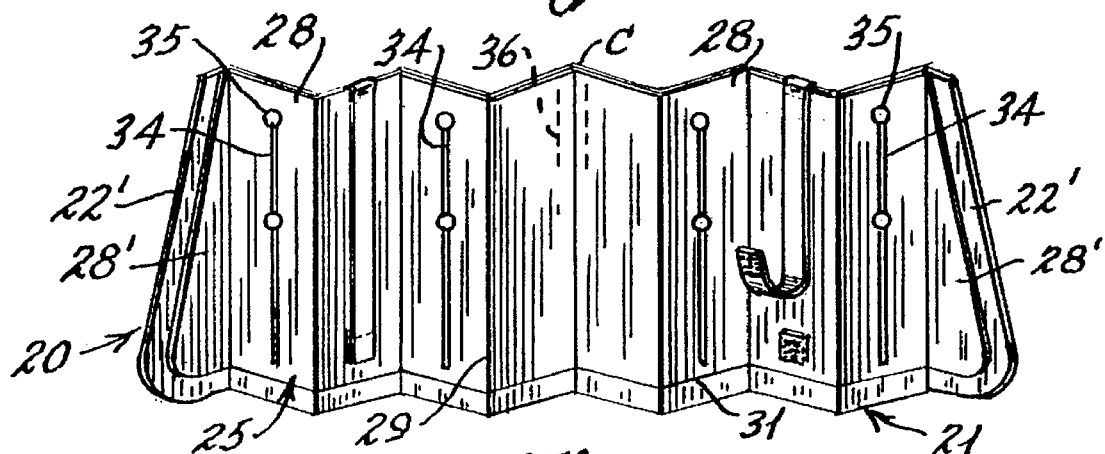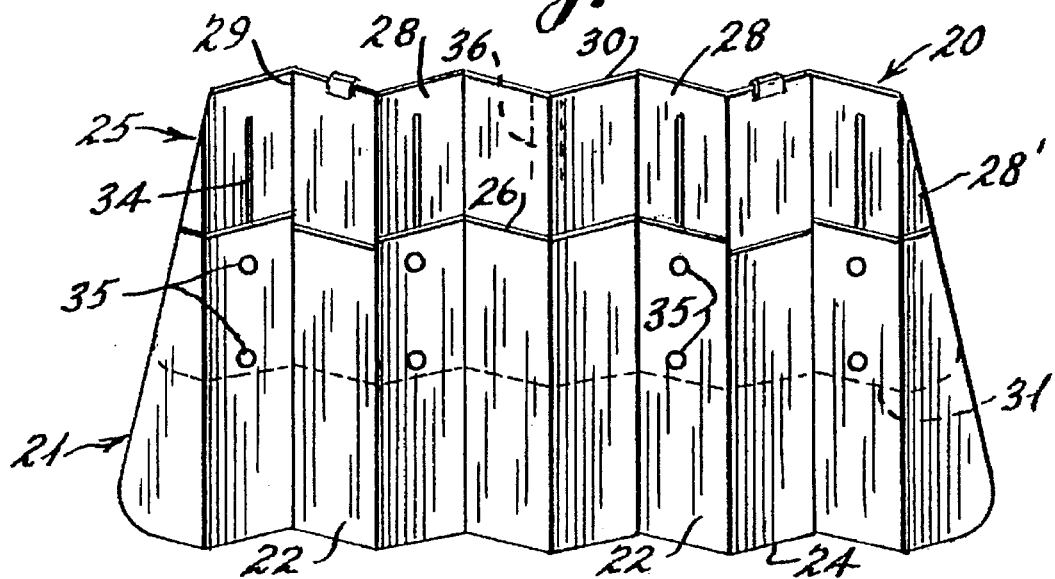

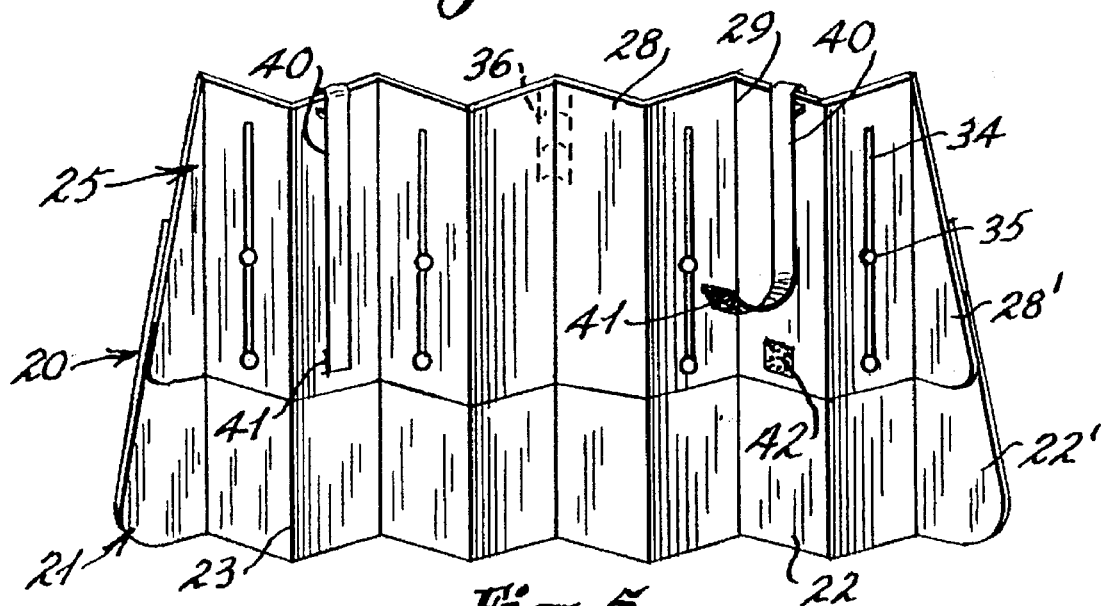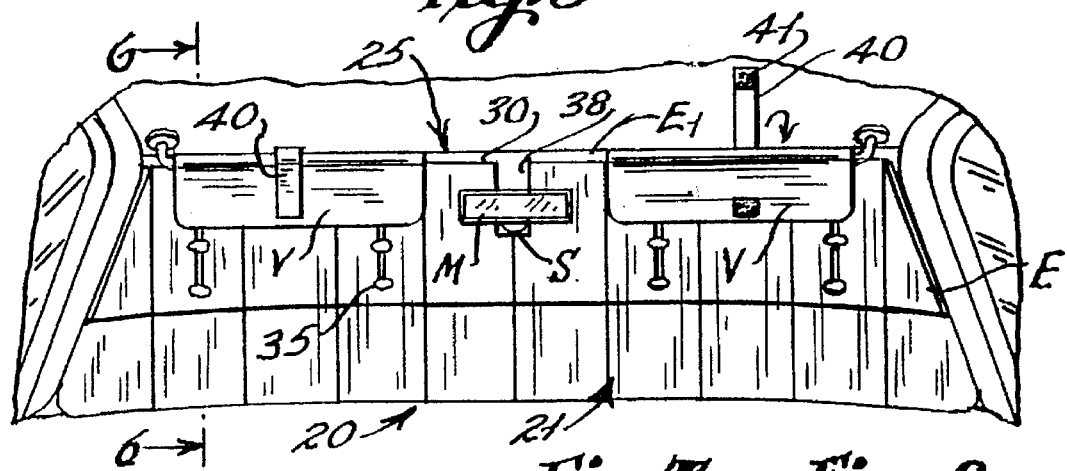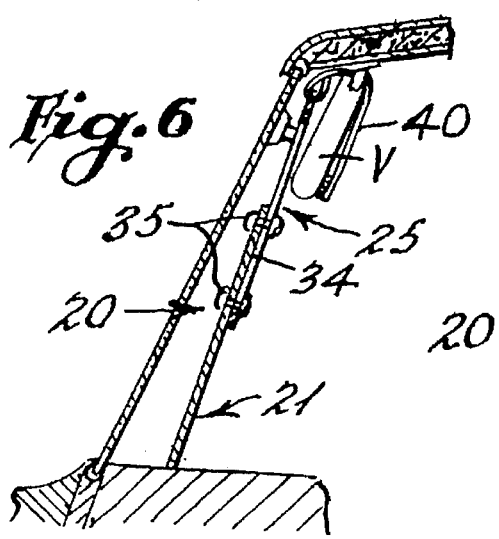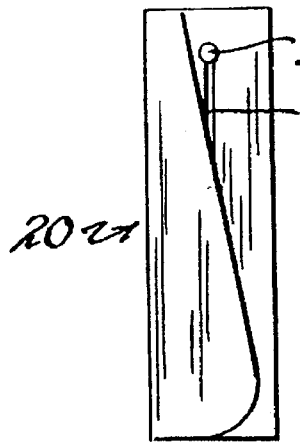

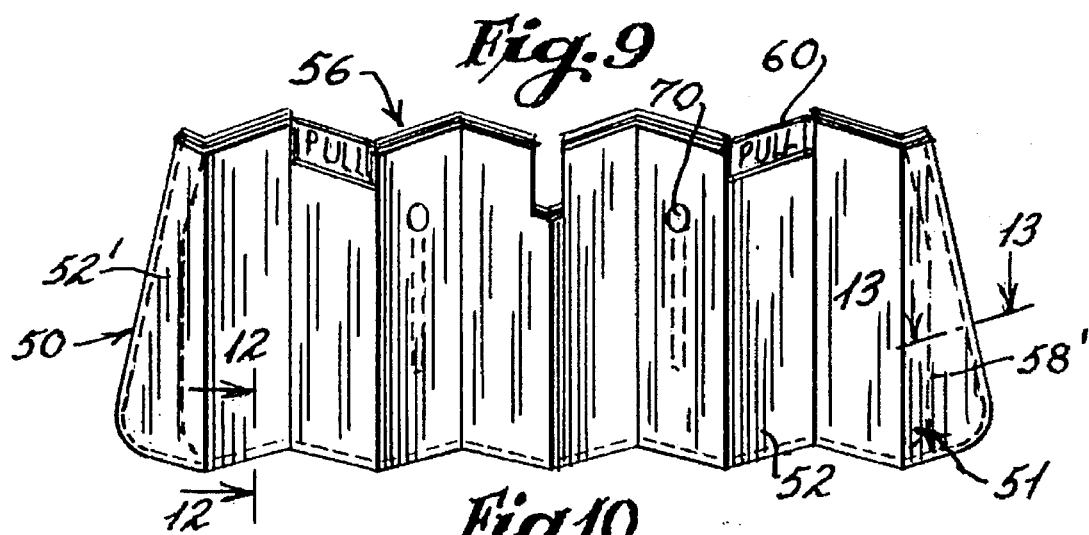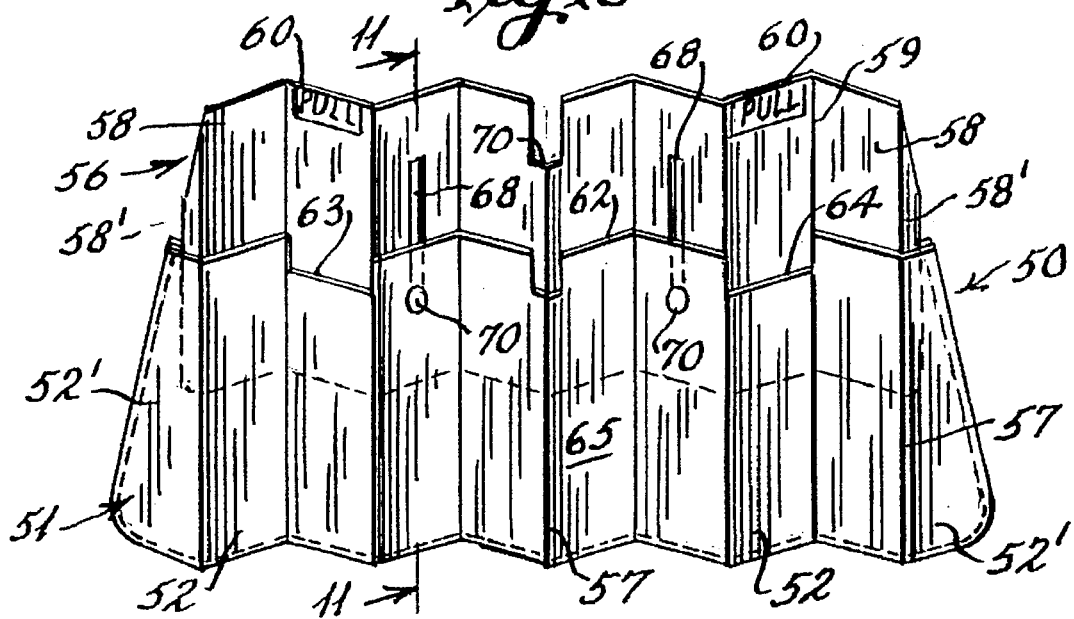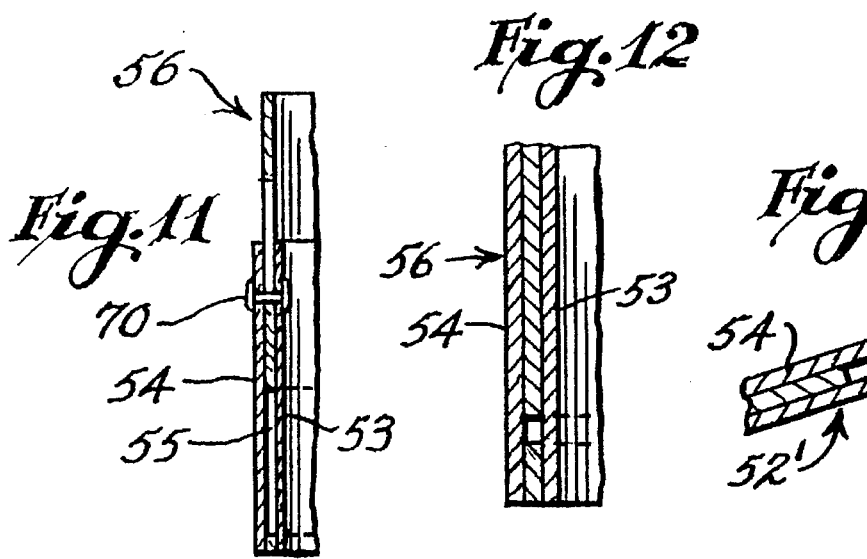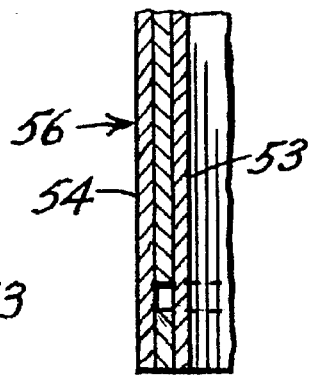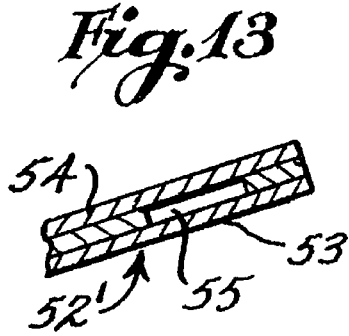

EXTENDIBLE VEHICLE WINDSHIELD SUNSHADE

BACKGROUND OF THE INVENTION

1. Field of the Invention

This invention is generally directed to portable sunshades for use with automotive vehicles of a type which are folded when not in use and which may be unfolded when deployed so as to extend across a substantial portion of the inner surface of a windshield in order to reduce the effect of radiant heating caused by the sun's energy passing through a windshield when a vehicle is not in use. More particularly, the invention is directed to a sunshade which is both horizontally and vertically adjustable so as to be universally adaptable for use with vehicles having varying windshield dimensions.

2. History of the Related Art

The interior of automotive vehicles is subject to extreme temperature variations, especially when vehicles are parked outside and subject radiant energy from the sun. Often, especially if the temperature is relatively warm and the sun is bright, the surface of vinyl and leather seats can be raised to such an elevation that they can burn the bare skin of an individual entering the vehicle. In addition, heat and radiant energy can also cause damage to materials used to form and cover the dashboard of vehicles as well as can affect electrical wiring extending within the dashboard.

To reduce the amount of radiant energy which enters a vehicle through the windshields associated therewith, in U.S. Pat. No. 4,202,396 to Levy, a sunshade was disclosed which was formed of a plurality of integrally hinged, generally rectangular panel members which could be extended outwardly across a substantial width of the windshield. The sunshade was formed of relatively inexpensive materials and collapsed in an accordion-fashion for storage in a vehicle. In use, the sunshade could be taken out and extended across the vehicle windshield and supported in position by the rearview mirror or sun visors.

Unfortunately, vehicle windshields vary dramatically in both height and width dimensions. Therefore, forming a sunshade of a particular size does not allow the sunshade to be used with the same results in different vehicles. By way of example, vehicle windshield heights may vary from approximately 19" to 32" with an average being approximately 28". A vehicle with the dimension taken across the top of the windshield may vary from as much as 38" to 56" with an average being approximately 45", whereas, the width dimension at the base of the windshield may vary between 50" and 67" with an average being approximately 57". If a sunshade is configured to meet the maximum size, it is not possible to adequately deploy the sunshade in vehicles having smaller dimensions. Likewise, if the sunshade is designed for smaller dimensioned windshields, the amount of radiation prevention is reduced drastically as large portions of the windshield are not effectively covered by the sunshade when deployed.

Since the introduction of the sunshade disclosed in the patent to Levy, there have been numerous modifications made and patented for sunshades having additional or differing characteristics considered to be improvements on the original Levy design. In U.S. Pat. No. 4,727,920 to Siegler, a windshield sunshade is disclosed which is foldable both horizontally and vertically. This allows the sunshade to be more compactly configured when in a stored or collapsed position so as to be conveniently stored in a vehicle. When deployed, the sunshade is unfolded, both vertically and horizontally and positioned against the windshield being supported by the rearview mirror or other elements. Unfortunately, the overall size of the sunshade is not adjustable and, therefore, the sunshade does not work effectively in vehicles having large windshields.

Other windshield sunshades are directed to forming the shades of different components having various reflective properties and yet others are directed toward the manner in which the sunshades are folded and unfolded when deployed. Examples of other sunshades are disclosed in U.S. Pat. Nos. 4,652,039 to Richards; 4,838,335 to Eskadary et al.; 4,878,708 to Champane; 4,883,304 to Elliott; 4,886,104 to Eldridge, Jr.; 4,947,920 to Moll; 5,044,686 to Acenbrac; 5,314,226 to Tovar; D309,885 to Gurruchaga; and U.K. Patent 2,242,176 to Gilchrist.

SUMMARY OF THE INVENTION

The present invention is directed to a compact and universally adjustable sunshade for use in covering the windshield of automotive vehicles which includes a plurality of integrally hinged sections which are foldable about vertical fold lines so as to be compactly stored in overlapping relationship with respect to one another. Each section includes at least one fixed base panel member as well as a telescoping or moveable panel member which is guidingly supported relative to the fixed base member so as to be vertically extendible so that the sunshade may be adapted to the full height of the vehicle windshield when placed into use.

In a first embodiment, the fixed base panel members are formed as generally rectangular pockets or sleeves having front and rear layers in which the moveable members are slidingly received. The base members are formed out of two plys of material having hinges integrally formed therein defining the limit of each panel. The moveable members are integrally formed of a single sheet of material also having hinged portions which are of such a size that the moveable members are slidingly received in each of the pockets of the base panel members. In the preferred embodiment, at least two of the moveable members have elongated slots therein through which fastening elements extending through the fixed members are received. The fastening elements unite the slidable members with the fixed base members but allow a telescopic sliding motion so that the sliding members may be deployed outwardly relative the fixed base members. By adjusting the fastening elements, the relative friction applied between the fixed base members and the moveable members may also be adjusted so as to ensure that the moveable members are retained in a deployed position when placed into use within a vehicle.

In a second embodiment of the invention, the fixed base members are formed of a single sheet of material which may be laminated of a plurality of layers and wherein the slidable or moveable members are telescopically moveable outwardly with respect to the fixed base members by utilizing a slot and fastener configuration as previously discussed.

In both embodiments, it is preferred that a cutout be provided in the central upper portion of the extendible or moveable panel members which may be selectively removed in the event the vehicle in which the sunshade is to be utilized has a rearview mirror mounted to the windshield. By removing the cutout, clearance is provided so that the slidable panels extend around the support for the rearview mirror.

Also, in either embodiment of the invention, a pair of straps may be provided which may be used to secure the extendible panel members relative to visors above the driver and passenger seats so as to retain the sunshade in a deployed position.

It is a primary object of the present invention to provide a portable sunshade for use with vehicle windshields which is adjustable both horizontally and vertically so as to be compatible with a wide range of vehicles having different sizes of windshields and wherein the sunshade may be collapsed vertically and subsequently folded about vertical fold lines so as to be compactly configured for storage.

It is yet another object of the present invention to provide a sunshade for use with automotive vehicle windshields which can be manufactured of relatively inexpensive materials and which is expandable horizontally and which is vertically extendible to fit substantially any vehicle windshield in vehicles of the sports car size to vehicles of the van or truck size.

BRIEF DESCRIPTION OF THE DRAWINGS

A better understanding of the invention will be obtained with reference to the accompanying drawings, wherein:

FIG. 1 is a front perspective view of a first embodiment of a sunshade constructed in accordance with the teachings of the present invention;

FIG. 2 is a rear perspective view of the sunshade of FIG. 1;

FIG. 3 is a front perspective view of the sunshade of FIG. 1 showing the moveable panel member in a vertically extended position;

FIG. 4 is a rear perspective view of the sunshade of FIG. 3;

FIG. 5 is an illustrational view showing the manner in which the sunshade of FIGS. 1-4 is deployed against an automotive windshield;

FIG. 6 is a cross-sectional view taken along line 6—6 of FIG. 5;

FIG. 7 is a side view of the sunshade of FIGS. 1-4 in a fully folded position;

FIG. 8 is a front plan view of the sunshade of FIGS. 1-4 in a fully folded position;

FIG. 9 is a front elevational view of a second embodiment of the present invention;

FIG. 10 is a rear perspective of the embodiment of FIG. 9 showing the moveable panel member in a vertically extended position;

FIG. 11 is a cross-sectional view taken along line 11—11 of FIG. 10;

FIG. 12 is an enlarged, partial cross-sectional view taken along line 12—12 of FIG. 9; and FIG. 13 is an enlarged, partial cross-sectional view taken along line 13—13 of FIG. 9.

DESCRIPTION OF THE PREFERRED EMBODIMENT

With continued reference to the drawing figures and particularly to drawings FIGS. 1-8, a first embodiment of the sunshade for use with automotive vehicles is disclosed in detail. The sunshade 20 includes a generally horizontally expandable base or fixed section 21 formed of a plurality of generally rectangular panel members 22 which are integrally connected at spaced hinges or fold lines 23. The outermost panel members 22' are generally triangular in configuration and are slightly rounded along the base 24 of the base section 21. The material from which the base section 21 is manufactured is preferably a paperboard or cardboard-like material which may be laminated to include varying characteristics. By way of example, aluminum foil may be sandwiched as a laminate between layers of paperboard or cardboard to form a freestanding material which is folded along the fold lines 23. The aluminum would function as an energy reflecting layer in combination with the remaining material.

As shown in FIGS. 2 and 3, secured to and extendible from the base section is a moveable section 25 which extends selectively upwardly from the upper edge 26 of the base section 21. The moveable section 25 includes a plurality of generally rectangular panel members 28 which are connected at integral fold lines 29. The outermost moveable panels 28' are generally triangular in configuration so as to conform to the shape of the outermost panel members 22' of the base section 21. The moveable section includes an uppermost edge 30 and a lower edge 31.

In order to secure the moveable section 25 relative to the base section 21, at least two of the moveable panel members have elongated slots 34 formed therein with four such slots being shown in the drawing figures. A pair of fastening elements, such as grommets or brads 35, extend through the panel members of the base section 21 and through the slots 34 and are flared outwardly on the opposite sides of the slots, thereby securing the moveable section relative to the base section. When the moveable section is raised, the amount of vertical movement is controlled by the lower series of fastening elements 35 engaging the bottom of the slots 34. By adjusting the tightness of the fastening elements 35, the amount of frictional pressure developed between the moveable section and the base section can be adjusted. It is desired that the moveable section be retained in any selected vertically adjusted position when raised relative to the base section until manually collapsed for storage, as shown in FIGS. 2, 7 and 8.

At the center "C" of the sunshade 20 and extending downwardly from the upper edge 30 of the moveable section 25, a series of perforations 36 are provided which may be removed so as to create a notch, such as shown at 38 of FIG. 5, for purposes of allowing the moveable member to extend on opposite sides of the support "S" of an automotive rearview mirror "M". With specific reference to FIG. 3, it is noted that the overall outer configuration of this sunshade 20 is such that the upper and lowermost edges thereof are defined by generally straight lines whereas the opposite sides taper outwardly from the uppermost to the lowermost edges to thereby conform to the configuration of most automotive windshields which have a greater dimension across the base of the windshield than across the top of the windshield.

The material from which the moveable section 25 is constructed as generally the same as that of the fixed section which may include a paperboard or cardboard-type material which may be a laminate including metallic foils and the like. As opposed to using paper, fibers or cardboard, the sunshade of the present invention may also be formed of a number of plastic materials with the hinges being formed as living hinges in the plastic.

With particular reference to FIGS. 7 and 8, when the sunshade 20 is not in use, it is designed to be compactly folded so that the panel members 22, 22' and the moveable panel members 28, 28' are folded into overlapping configuration with respect to one another after the moveable panel has been urged into alignment, as shown in FIG. 2, with the base section. In use, and as shown in FIGS. 5 and 6, the sunshade is first deployed by extending the outer panel members 22' toward the side edges "E" of the vehicle windshield. Thereafter, the moveable section 25 is raised until the upper edge 30 thereof is positioned against the upper edge "$E_1$" of the vehicle windshield. In this position, the lower edge 24 of the fixed section rests at the bottom of the windshield so that substantially the entire windshield is now covered by the sunshade. In many instances, the sunshade will be supported simply by resting the sunshade against the rearview mirror, as shown in FIG. 5. To further facilitate the positioning and retention of the sunshade against the windshield, the vehicle visors "V" may be rotated downwardly into engagement with the surface of the sunshade.

To further facilitate the manner in which the sunshade is deployed, a pair of straps 40 may be secured adjacent the upper edge of the moveable section. The straps include hook and loop fabric fastening elements 41 such as Velcro™ which are applied to the free end thereof. By passing the straps upwardly and over the visors "V" of an automotive vehicle, the straps may be attached to the visors. In some instances, a second hook and loop fabric fastener 42 may be applied to the moveable panel member for selective engagement by the end of the straps when the straps are not in use. In FIG. 6, it is shown that the end of the strap is engaged with the fabric material of the visor and held in position. With specific reference to FIGS. 9–13, a second embodiment of the invention is disclosed in greater detail. In this embodiment, the fixed base and moveable sections are essentially the same as in the previous embodiment with the exception that the base section is formed of two separate material layers. The sunshade 50 includes a generally fixed base section 51 defined by a plurality of panel members 52 which are generally rectangular in configuration with the outer panel members 52' being generally triangular for purposes of conforming to the shape of a windshield as previously discussed.

Each of the panels 52 is formed having inner and outer layers 53 and 54 which are formed of the same materials as discussed with respect to the previous embodiment and which may be laminated. The inner and outer layers define generally rectangular pockets 55 in which a moveable section 56 may be slidingly received. Each of the base panel members is attached to an adjacent panel member at fold lines 57 so that the sunshade may be folded into a compact configuration, as previously described.

The moveable section 56 includes a plurality of generally rectangular panel members 58 which are connected at fold lines 59 with the outermost panel elements 58' being generally triangular for purposes as described with respect to the previous embodiment. The upper edge of two spaced panel members 58 may include reinforcing hand engaging pull elements 60 adapted to be engaged to lift the moveable section from the pockets 55 defined by the base panel members. To facilitate the grasping of the pull elements 60, the upper edge 62 of the base section may be cut out at 63 and 64 to allow the pull elements to be exposed through the front face 65 thereof.

At least two of the panel members 58 of the moveable section include elongated slots 68 therein through which fasteners 70 mounted through the base panel members selectively extend. The fasteners may be grommet-type elements have spreadable legs for securing the fasteners in place relative to the slots 68. In this manner, the bottom portion of the slots define the limit of vertical movement of the moveable section relative to the base section.

As with the previous embodiment, perforations may be provided in the moveable section at the center portion thereof or a cutout 70 may be provided for purposes of allowing the moveable member to pass on either side of the support "S" for a vehicle rearview mirror.

The deployment and storage of the second embodiment is essentially identical to that of the first. Also, straps, such as those described in the previous embodiment, may be incorporated in the second embodiment.

In addition to the foregoing, in some embodiments, it may be possible to do away with the slots 68 and fasteners 70 in the second embodiment. By forming the envelope structure of the fixed base section sufficiently rigid so as to create a tight sliding fit for the moveable section, it is possible to ensure that sufficient frictional force is applied to the moveable member so that the moveable member may be retained in any selected adjusted position without the use of the separate fasteners. This would aid in reducing the cost of manufacturing the sunshade.

The general dimensions of the present invention are designed to allow the sunshade to be expanded to an average size of the vehicle windshield when considering the maximum and minimum dimensions in the height and width of such windshields. Therefore, in the preferred embodiments, the average dimensions would be approximately 28" in overall height with the moveable section expanded, approximately 45" in width along the top portion of the sunshade and approximately 57" along the bottom portion thereof.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

What is claimed is:

1. A sunshade for use in covering the windshield of a vehicle comprising:

a base section having upper and lower edges and opposite side edges, said base portion being formed of a plurality of panel members connected by fold lines so that the panel members may be oriented in overlapping relationship with respect to one another in a first collapsed position or extended outwardly relative to one another in a second deployed position, a moveable upper section having upper and lower edges and opposite side edges, said moveable upper section including a plurality of panel members joined by fold lines, and means for securing said moveable section to said base section so that said moveable section is extendable vertically from said base section and wherein said panel members of said moveable section are moveable from a first position generally underlying the panel members of the base section to an extended position wherein at least a portion of said panel members of said moveable section are extended vertically from said base section.

2. The sunshade of claim 1 in which said opposite sides of said moveable section and said base section taper outwardly from the upper edge to said lower edge of said moveable section and said base section, respectively.

3. The sunshade of claim 1 wherein at least two of said panel members of said moveable section have elongated slots therein and said means for connecting said moveable section to said base section including fastening elements extending through said base section and through said slots in said panel members of said moveable section whereby said slots define the limit of vertical movement of said moveable section relative to said base section.

4. The sunshade of claim 3 in which said moveable section includes a central portion, a perforated section extending from said upper edge of said moveable section along said central portion, wherein said moveable section may be selectively removed to provide clearance with respect to an automotive rear view mirror.

5. The sunshade of claim 3 including strap means secured to said moveable section adjacent said upper edge thereof, said strap means including a fabric material fastening element for securing said strap means relative to a vehicle visor.

6. The sunshade of claim 1 including strap means secured to said moveable section adjacent said upper edge thereof, said strap means including a fabric material fastening element for securing said strap means relative to a vehicle visor.

7. The sunshade of claim 3 wherein said base section is formed of two material layers defining pockets for each of said panel members of said base section, said panel members of said moveable section being slidingly received within said pockets defined by said panel members of said base section.

8. The sunshade of claim 1 wherein said base section is formed of two material layers defining pockets for each of said panel members of said base section, said panel members of said moveable section being slidingly received within said pockets defined by said panel members of said base section.

9. The sunshade of claim 8 in which said opposite sides of said moveable section and said base section taper outwardly from the upper edge to said lower edge of said moveable section and said base section, respectively.

10. The sunshade of claim 8 including strap means secured to said moveable section adjacent said upper edge thereof, said strap means including a fabric material fastening element for securing said strap means relative to a vehicle visor.

11. The sunshade of claim 8 wherein said upper edge of said base section includes a pair of spaced cutouts, said upper edge of said moveable section including a pair of reinforced hand grasp portions, said hand grasp portions being aligned with said cutouts when said moveable section is positioned in underlying relationship with respect to said base section.

* * * * *